(12) United States Patent
Yang et al.

(10) Patent No.: US 10,919,990 B2
(45) Date of Patent: Feb. 16, 2021

(54) LATEX COMPOSITION FOR DIP-FORMING AND DIP-FORMED ARTICLE PRODUCED THEREFROM

(71) Applicant: LG Chem, Ltd., Seoul (KR)

(72) Inventors: Seung Hun Yang, Daejeon (KR); Seung Uk Yeu, Daejeon (KR); Jung Su Han, Daejeon (KR); Jung Eun Kim, Daejeon (KR)

(73) Assignee: LG Chem, Ltd.

( * ) Notice: Subject to any disclaimer, the term of this patent is extended or adjusted under 35 U.S.C. 154(b) by 298 days.

(21) Appl. No.: 15/751,006

(22) PCT Filed: Oct. 5, 2016

(86) PCT No.: PCT/KR2016/011127
§ 371 (c)(1),
(2) Date: Feb. 7, 2018

(87) PCT Pub. No.: WO2017/090881
PCT Pub. Date: Jun. 1, 2017

(65) Prior Publication Data
US 2018/0230244 A1    Aug. 16, 2018

(30) Foreign Application Priority Data

Nov. 24, 2015  (KR) .................. 10-2015-0164395

(51) Int. Cl.
| | |
|---|---|
| C08C 19/34 | (2006.01) |
| B29C 41/14 | (2006.01) |
| C09D 113/02 | (2006.01) |
| C08J 5/02 | (2006.01) |
| C08K 3/22 | (2006.01) |
| C08K 5/09 | (2006.01) |
| C08F 236/12 | (2006.01) |
| B29C 41/00 | (2006.01) |
| B29K 7/00 | (2006.01) |

(52) U.S. Cl.
CPC .............. *C08C 19/34* (2013.01); *B29C 41/00* (2013.01); *B29C 41/003* (2013.01); *B29C 41/14* (2013.01); *C08F 236/12* (2013.01); *C08J 5/02* (2013.01); *C08K 3/22* (2013.01); *C08K 5/09* (2013.01); *C09D 113/02* (2013.01); *B29K 2007/00* (2013.01); *C08J 2309/04* (2013.01)

(58) Field of Classification Search
CPC ..................................................... C08C 19/34
See application file for complete search history.

(56) References Cited

U.S. PATENT DOCUMENTS

| | | | |
|---|---|---|---|
| 2,380,699 | A | 7/1945 | Kyrides |
| 3,579,453 | A | 5/1971 | Dupre et al. |
| 6,596,796 | B1 | 7/2003 | Meier et al. |
| 7,829,600 | B1 | 11/2010 | Trksak et al. |
| 2002/0101007 | A1 | 8/2002 | Koide et al. |
| 2004/0247910 | A1 | 12/2004 | Janssen et al. |
| 2007/0049697 | A1 | 3/2007 | Miyawaki et al. |
| 2008/0227913 | A1 | 9/2008 | Koide |
| 2011/0198543 | A1 | 8/2011 | Tarumoto et al. |
| 2015/0022553 | A1 | 1/2015 | Bono |
| 2016/0137830 | A1 | 5/2016 | Ahn et al. |

FOREIGN PATENT DOCUMENTS

| | | |
|---|---|---|
| CN | 104169354 A | 11/2014 |
| JP | S59128353 A | 7/1984 |
| JP | 20072106 A | 1/2007 |
| JP | 2007525336 A | 9/2007 |
| JP | 200844993 A | 2/2008 |
| JP | 2009155634 A | 7/2009 |
| JP | 2010047729 A | 3/2010 |
| JP | 2010059441 A | 3/2010 |
| JP | 2011110554 A | 6/2011 |
| JP | 2014193826 A | 10/2014 |
| JP | 201596576 A | 5/2015 |
| KR | 20010051070 A | 6/2001 |
| KR | 20040057408 A | 7/2004 |
| KR | 20080040011 A | 5/2008 |
| KR | 20100066005 A | 6/2010 |
| KR | 20110074751 A | 7/2011 |
| KR | 20150016093 A | 2/2015 |
| KR | 20150030994 A | 3/2015 |
| WO | 2011068394 A1 | 6/2011 |

OTHER PUBLICATIONS

"Science and Technologys for Polymeric Material Molding", Fang, Shaoming, Feng Na, China Light Industry Press, Version 1, Jun. 30, 2014, pp. 305-306 (abstract in English translation included).
Search Report from Chinese Office Action for CN201680054748.7 dated Sep. 17, 2019.
Search report from International Application No. PCT/KR2016/011127, dated Jan. 12, 2017.

*Primary Examiner* — Larry W Thrower
(74) *Attorney, Agent, or Firm* — Lerner, David, Littenberg, Krumholz & Mentlik, LLP

(57) ABSTRACT

Disclosed is a latex composition for dip-molding and a dip-molded article produced therefrom. More specifically, a dip-molded article having slow syneresis, less stickiness and superior tensile strength is produce by dip-molding of a carbonic acid-modified nitrile-based copolymer latex having increased molecular stability due to the combined use of alkenylsuccinate, which is an emulsifier crosslinkable with the latex and having a flexible molecular structure.

13 Claims, No Drawings

LATEX COMPOSITION FOR DIP-FORMING AND DIP-FORMED ARTICLE PRODUCED THEREFROM

CROSS-REFERENCE TO RELATED APPLICATIONS

The present application is a national phase entry under 35 U.S.C. § 371 of International Application No. PCT/KR2016/011127 filed Oct. 5, 2016, which claims priority from Korean Patent Application No. 10-2015-0164395 filed Nov. 24, 2015, all of which are incorporated herein by reference.

TECHNICAL FIELD

The present invention relates to a latex composition for dip-molding and a dip-molded article produced therefrom, wherein the latex composition enables the production of a dip-molded article having slow syneresis, less stickiness and superior tensile strength.

BACKGROUND ART

Disposable rubber gloves used in daily life such as housework, food industry, electronics industry, medical field, etc. are made by dip-molding of natural rubber or a carbonic acid-modified nitrile-based copolymer latex. In recent years, due to allergy issues and unstable supply/demand problems of natural rubber, carbonic acid-modified nitrile-based gloves are in the spotlight on the disposable glove market.

On the other hand, there have been various attempts to increase glove productivity in response to growing demand for gloves. Among these attempts, the most common approach is to lighten the glove while maintaining its strength. In the past disposable nitrile gloves having a weight of about 4 g have been generally used, although it is now required to provide gloves which are made thinner to have a weight of about 3.2 g and exhibit a tensile strength of at least 6 N. However, even though an aging process is performed, it is not easy to ensure a tensile strength at a level of 6 N for thin gloves having a weight of 3.2 g.

For production of gloves via dip-molding, a cross-linking process is performed in an oven after a dipping process, and it is required to perform a cross-linking process for a long time period in order to achieve high tensile strength. However, since a cross-linking process is performed for a short time period in order to save costs and to shorten the overall process time, it is difficult to ensure sufficient tensile strength with a cross-linking process. For this purpose, various methods, in which a cross-linkable material is added to latex, have been proposed; however, up until now, a satisfactory level of physical properties may not be achieved.

Gloves having a higher level of tensile strength and also having a thinner thickness may be produced by lowering the concentration of latex. However, when a dip-molding process is performed by using a low concentration of latex, syneresis, a phenomenan in which water quickly runs out, occurs seriously in the formation of glove films, and the produced gloves also exhibit stickiness problems. This may cause coagulation of a latex composition, which, in turn, produces numerous pinholes, thereby increasing the rate of failure for gloves.

Thus, there remains a need for a technique of producing gloves, allowing good workability in the production of gloves, having no stickiness and being thin but not easily tearable due to high tensile strength.

PRIOR ART LITERATURE (Patent Document 1) Korean Laid-open Patent Publication No. 10-2010-0066005, entitled "RUBBER COMPOSITION AND RUBBER GLOVE PRODUCED BY USING THE SAME"

(Patent Document 2) WO 2011/068394, entitled "ELASTOMERIC RUBBER AND RUBBER PRODUCTS WITHOUT THE USE OF VULCANIZING ACCELERATORS AND SULFUR"

DISCLOSURE

Technical Problem

The present inventors have conducted a variety of studies to solve the above problems. As a result, we have selected alkenylsuccinate, which is an emulsifier crosslinkable with a carbonic acid-modified nitrile-based copolymer latex and having a flexible molecular structure, and have identified that slow syneresis and improved physical properties are achieved for the resulting dip-molded article when dip-molding is performed by adding alkenylsuccinate at the time of or after copolymerization of latex, thereby completing the invention.

Technical Solution

According to one aspect of the present disclosure, there is provided a latex composition which has increased syneresis time in a dip-molding process, exhibits less stickiness and exhibits superior tensile strength.

According to another aspect of the present disclosure, there is provided a molded article produced from the above latex composition for dip-molding.

According to further aspect of the present disclosure, there is provided a method of producing a molded article by using the above latex composition for dip-molding.

The present disclosure provides a latex composition for dip-molding including a carbonic acid-modified nitrile-based copolymer latex and an alkenyl succinic acid compound, wherein the alkenyl succinic acid compound is a succinic acid compound having a linear or branched C12-C20 alkenyl group.

Also, the present disclosure provides a dip-molded article produced by dip-molding of the above latex composition for dip-molding.

Further, the present disclosure provides a method of producing a dip-molded article including:

a) applying and drying a coagulant solution to a mold;

b) applying a latex composition for dip-molding to the coagulant-applied mold to form a dip-molded layer;

c) cross-linking the dip-molded layer; and d) peeling off the cross-linked dip-molded layer from the mold to obtain a dip-molded article, wherein the latex composition for dip-molding is a latex composition as described aforementioned.

Advantageous Effects

A latex composition for dip-molding according to any embodiment of the present disclosure uses an alkenyl succinic acid compound in combination with a carbonic acid-modified nitrile-based copolymer latex to increase the stability of the latex composition.

A latex composition having such high stability has increased syneresis time in a dip-molding process, thereby resulting in improved workability.

Furthermore, the resulting dip-molded article has no stickiness and exhibits superior tensile strength, and thus allows to ensure high quality even though it is produced to have a thinner thickness.

BEST MODE

One feature of the present invention is to use an alkenyl succinic acid compound having functional groups capable of double bonding and hydrogen bonding within the molecular structure such that it is copolymerizable with a carbonic acid-modified nitrile-based copolymer latex in the production of a latex composition for dip-molding through a dip-molding process Latex Composition for Dip-Molding A latex composition for dip-molding according to any embodiment of the present disclosure includes a carbonic acid-modified nitrile-based copolymer latex and an alkenyl succinic acid compound.

Specifically, an alkenyl succinic acid compound is represented by the following formula (1):

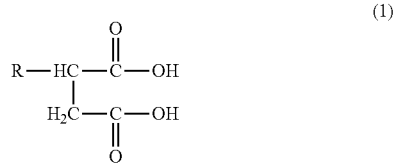

(1)

wherein R is a linear or branched C12-C20 alkenyl group.

As used herein, "alkenyl" refers to a monovalent substituent derived from a linear or branched unsaturated hydrocarbon having 12 to 20 carbon atoms and having at least one carbon-carbon double bond, and includes at least one double bond, for example, 1 to 4 double bonds in the structure.

For example, alkenyl may include decenyl, undecenyl, dodecenyl, tridecenyl, tetradecenyl, hexadecenyl, octadecenyl, dodecadienyl, tetradecadienyl, hexadecadienyl, hexadecatrienyl, octadecadienyl, octadecatrienyl, etc.

As shown in the above Formula (1), an alkenyl succinic acid compound proposed in the present disclosure may have a long chain alkenyl group having C12 or higher, for example, C12 to C20, or C16 to C18, within the molecular structure, and may include two carbonic acids at its ends.

At the time of copolymerization of a carbonic acid-modified nitrile-based copolymer latex, double bonds present within the above compound are copolymerizable with monomers constituting the latex and carbonic acids present within the above compound are crosslinkable by hydrogen bonding with carbonic acids present within carbonic acid-modified nitrile-based copolymer latex. Consequently, the resulting stabilized latex may have increased syneresis time (i.e. slow syneresis) in a dip-molding process and thus have improved workability and productivity while exhibiting lowered stickiness and increased tensile strength of the produced dip-molded article.

In order to ensure the above-mentioned effects, the amount of alkenyl succinic acid compound may be limited. Preferably, an alkenyl succinic acid compound is used in an amount of 0.01 to 10 parts by weight, for example, 0.1 to 5 parts by weight, based on 100 parts by weight of total monomers used in the production of a carbonic acid nitrile-modified latex. If the amount is less than the above ranges, the above-mentioned effects may not be obtained. On the contrary, if the amount is more than the above ranges, there may be a concern that the tensile strength decreases and the stickiness occurs. Thus, it is appropriately used within the above ranges.

Such alkenyl succinic acid compound is used in the form of a metal salt, wherein the metal salt may be sodium ($Na^+$), potassium ($K^+$), or lithium ($Li^+$) salt.

In particular, a latex composition for dip-molding according to according to any embodiment of the present disclosure is produced by adding an alkenyl succinic acid compound before and/or after copolymerization of latex.

According to one embodiment of the present disclosure, the above latex composition for dip-molding is produced by adding an alkenyl succinic acid compound at the time of copolymerization of a carbonic acid-modified nitrile-based copolymer latex.

According to another embodiment of the present disclosure, the above latex composition for dip-molding is produced by being mixed with an alkenyl succinic acid compound after a carbonic acid-modified nitrile-based copolymer latex is produced.

According to further embodiment of the present disclosure, the above latex composition for dip-molding is produced by adding an alkenyl succinic acid compound at the time of copolymerization of latex to produce a carbonic acid-modified nitrile-based copolymer latex, and then mixing the produced carbonic acid-modified nitrile-based copolymer latex with an alkenyl succinic acid compound.

In this regard, the addition of an alkenyl succinic acid at the time of copolymerization is carried out before or during the initiation of copolymerization.

In Examples 1 to 6 of the present disclosure, an alkenyl succinic acid compound was added together with monomers at the time of polymerization of a carbonic acid-modified nitrile-based copolymer latex; in Example 7, it was used to be mixed after polymerization of latex; and in Example 8, it was added both timings, at the time of and after polymerization. The following effects may be ensured in all of Examples 1 to 8: increased syneresis in a dip-molding process, and lowered stickiness and improved tensile strength in a dip-molded article.

A carbonic acid-modified nitrile-based copolymer latex, to which the above-described alkenyl succinic acid compound is added, is produced by the addition of an emulsifier, a reactive compound, a polymerization initiator, a molecular weight modifier and other additives to monomers, followed by emulsion polymerization.

The above monomers may include a conjugated diene-based monomer, an ethylenically unsaturated nitrile-based monomer, an ethylenically unsaturated acid monomer, and an unsaturated ethylenic monomer copolymerizable therewith.

A conjugated diene-based monomer, which is one monomer that constitutes a carbonic acid-modified nitrile-based copolymer latex according to any embodiment of the present disclosure, may include, for example, one or more selected from the group consisting of 1,3-butadiene, 2,3-dimethyl-1, 3-butadiene, 2-ethyl-1,3-butadiene, 1,3-pentadiene and isoprene, and 1,3-butadiene and isoprene may be used, and for instance, 1,3-butadiene may be used.

The above conjugated diene-based monomer accounts for 40 to 75% by weight, for example, 45 to 70% by weight, or 50 to 68% by weight, based on total monomers constituting a carbonic acid-modified nitrile-based copolymer. If the amount is less than the above ranges, the resulting dip-molded article becomes hard and exhibits poor wearing sensation. On the contrary, if the amount is more than the above ranges, the resulting dip-molded article has poor oil resistance and decreased tensile strength.

An ethylenically unsaturated nitrile-based monomer, which is another monomer that constitutes a carbonic acid-modified nitrile-based copolymer latex according to any embodiment of the present disclosure, may includes one or more selected from the group consisting of acrylonitrile, methacrylonitrile, fumaronitrile, α-chloronitrile, α-cyanoethyl acrylonitrile, and combinations thereof, and among these, acrylonitrile and methacrylonitrile may be used, and for instance, acrylonitrile may be used.

An ethylenically unsaturated nitrile-based monomer accounts for 10 to 50% by weight, for example, 15 to 45% by weight, or 20 to 40% by weight, based on total monomers constituting a carbonic acid-modified nitrile-based copolymer. If the amount is less than the above ranges, the resulting dip-molded article has poor oil resistance and decreased tensile strength. On the contrary, if the amount is more than the above ranges, the resulting dip-molded article exhibits the problems such as becoming hard, poor wearing sensation, etc.

An ethylenically unsaturated acid monomer, which is another monomer that constitutes a carbonic acid-modified nitrile-based copolymer according to any embodiment of the present disclosure, has one or more acidic groups selected from the group consisting of a carboxyl group, a sulfonic acid group and an acid anhydride group.

The above ethylenically unsaturated acid monomer may include, for example, an ethylenically unsaturated carbonic acid monomer such as acrylic acid, methacrylic acid, itaconic acid, maleic acid, fumaric acid, etc.; a polycarboxylic anhydride such as maleic anhydride, citraconic anhydride, etc.; an ethylenically unsaturated sulfonic acid monomer such as styrenesulfonic acid, etc.; an ethylenically unsaturated polycarbonic acid partial ester monomer such as monobutyl fumarate, monobutyl maleate, mono-2-hydroxypropyl maleate, etc., and methacrylic acid may be used. Such ethylenically unsaturated acid monomer may be used in the form of, for example, alkali metal salts or ammonium salts.

The above ethylenically unsaturated acid monomer accounts for 0.1 to 10% by weight, for example, 0.5 to 9% by weight, or 1 to 8% by weight, based on total monomers constituting a carbonic acid-modified nitrile-based copolymer. If the amount is less than the above ranges, the resulting dip-molded article has decreased tensile strength. On the contrary, if the amount is more than the above ranges, the resulting dip-molded article becomes hard and exhibits poor wearing sensation.

A carbonic acid-modified nitrile-based copolymer according to any embodiment of the present disclosure may optionally further include other ethylenically unsaturated monomer copolymerizable with the above ethylenically unsaturated nitrile monomer and ethylenic unsaturated acid monomer.

A copolymerizable ethylenically unsaturated monomer may include a vinyl aromatic monomer selected from the group consisting of styrene, alkyl styrene and vinyl naphthalene; fluoroalkyl vinyl ether such as fluoro ethyl vinyl ether, etc.; an ethylenically unsaturated amide monomer selected from the group consisting of (meth)acrylamide, N-dimethylol (meth)acrylamide, N,N-dimethylol (meth) acrylamide, N-methoxymethyl (meth)acrylamide and N-propoxymethyl (meth)acrylamide; a nonconjugated diene monomer such as vinylpyridine, vinylnorbornene, dicyclopentadiene, 1,4-hexadiene, etc.; an ethylenically unsaturated carbonic acid ester monomer including methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth) acrylate, 3-cyanopropyl (meth)acrylate, hydroxyethyl (meth)acrylate, hydroxypropyl (meth)acrylate, glycidyl (meth)acrylate, dimethylaminoethyl (meth)acrylate, etc.

The above other ethylenically unsaturated monomer copolymerizable with the above ethylenically unsaturated nitrile-based monomer and ethylenically unsaturated acid monomer may be used in an amount of 0.001 to 20% by weight based on total monomers constituting a carbonic acid-modified nitrile-based copolymer; if the amount exceeds 20% by weight, the balance is not well maintained between soft wearing sensation and tensile strength.

As mentioned previously, a carbonic acid-modified nitrile-based copolymer latex according to any embodiment of the present disclosure may be produced by the addition of an emulsifier, a polymerization initiator, a molecular weight modifier, etc. to monomers constituting a carbonic acid-modified nitrile-based copolymer, followed by emulsion polymerization.

Specifically, a carbonic acid-modified nitrile-based copolymer latex is produced by the following steps of:

(a) adding a conjugated diene monomer, an ethylenically unsaturated nitrile monomer, an ethylenically unsaturated acid monomer, an emulsifier, a polymerization initiator and deionized water to a polymerization reactor;

(b) performing emulsion polymerization, (c) terminating the polymerization.

In above step (a), the conjugated diene monomer, the ethylenically unsaturated nitrile monomer, the ethylenically unsaturated acid monomer, the emulsifier and the polymerization initiator may be introduced into the polymerization reactor all at one time or continuously. Also, the entire amount of each component may be added to the polymerization reactor at once, or a portion of each component may be added to the polymerization reactor, and then the remaining portion may be added again continuously to the polymerization reactor.

According to one embodiment of the present invention, an alkenyl succinic acid compound may be added into the polymerization reactor together with monomers in above step (a).

Hereinafter, a composition used for copolymerization will be described in more detail.

As for an emulsifier, an anionic surfactant, a nonionic surfactant, a cationic surfactant, an amphoteric surfactant, etc. may be used, but not particularly limited thereto. Among these, an anionic surfactant selected from the group consisting of alkylbenzene sulfonic acid salt, aliphatic sulfonic acid salt, sulfuric acid ester salt of higher alcohol, α-olefin sulfonic acid salt and alkyl ether sulfuric acid ester salt, may be used.

In this regard, the amount of emulsifier used is 0.3 to 10 parts by weight, for example, 0.8 to 8 parts by weight, or 1.5 to 6 parts by weight, based on 100 parts by weight of monomers constituting a carbonic acid-modified nitrile-based copolymer. If the amount is less than the above ranges, the stability at the time of polymerization is lowered. On the contrary, if the amount is more than the above ranges, it may cause a problem of excessive foaming, thereby making it difficult to produce a dip-molded article.

As for a polymerization initiator, a radical initiator may be used, but not particularly limited thereto. Examples of a radical initiator may include one or more selected from the group consisting of inorganic peroxide such as sodium persulfate, potassium persulfate, ammonium persulfate, potassium perphosphate, hydrogen peroxide, etc.; organic peroxide such as t-butyl peroxide, cumene hydroperoxide, p-menthol hydroperoxide, di-t-butyl peroxide, t-butyl cumyl peroxide, acetyl peroxide, isobutyl peroxide, octanoyl peroxide, dibenzoyl peroxide, 3,5,5-trimethylhexanol peroxide, t-butyl peroxyisobutyrate, etc.; azobisisobutyronitrile, azobis-2,4-dimethylvaleronitrile, azobiscyclohexanecarbonitrile, and azobis isobutyric acid methyl, and among these, inorganic peroxide, for example, persulfates may be used.

The amount of polymerization initiator used is 0.01 to 2 parts by weight, for example, 0.02 to 1.5 parts by weight, based on 100 parts by weight of total monomers constituting a carbonic acid-modified nitrile-based copolymer. If the amount is less than the above ranges, polymerization rate is lowered, thereby making it difficult to produce the final product. On the contrary, if the amount is more than the above ranges, the polymerization rate becomes too fast, thereby making it difficult to control polymerization.

An activating agent may be used and may include one or more selected from the group consisting of sodium formaldehyde sulfoxylate, sodium ethylenediamine tetraacetate, ferrous sulfate, dextrose, sodium pyrophosphate and sodium sulfite.

As for a molecular weight regulator, its examples may include, but are not limited to, mercaptan such as α-methylstyrene dimer, t-dodecyl mercaptan, n-dodecyl mercaptan, octyl mercaptan, etc.; halogenated hydrocarbon such as carbon tetrachloride, methylene chloride, methylene bromide, etc.; sulfur-containing compound such as tetraethylthiuram disulfide, dipentamethylenethiuram disulfide, diisopropylkisantigen disulfide, etc.

Such molecular weight modifier may be used alone or in combination of two or more. Among these, mercaptan, for example, t-dodecyl mercaptan may be used. The amount of molecular weight modifier used may vary depending on its type, but it is, for example, 0.1 to 2.0 parts by weight, or 0.2 to 1.5 parts by weight, or 0.3 to 1.0 parts by weight, based on 100 parts by weight of total monomers constituting a carbonic acid-modified nitrile-based copolymer. If the amount is less than the above-mentioned ranges, the physical properties of the resulting dip-molded article are significantly deteriorated. On the contrary, if the amount is more than the above ranges, the polymerization stability is lowered.

In addition, other additives, such as a chelating agent, a dispersing agent, a pH adjusting agent, an oxygen scavenger, a particle size regulating agent, an anti-aging agent, an oxygen scavenger, etc., may be added at the time of polymerization of a latex according to any embodiment of the present disclosure.

The method for introducing a monomer mixture constituting a carbonic acid-modified nitrile-based copolymer may include a method of introducing a monomer mixture into the polymerization reactor all at once, a method of continuously introducing a monomer mixture into the polymerization reactor, a method of introducing a portion of a monomer mixture into the polymerization reactor and supplying the remaining portion continuously to the polymerization reactor, and any of these methods may be used.

In above step (b), the polymerization temperature at the time of emulsion polymerization may be 10 to 90° C., for example, 20 to 80° C., or 25 to 75° C., but is not particularly limited thereto.

In above step (c), the conversion at the time of terminating the polymerization reaction may be 85% or more, for example, 88 to 99%, or 90 to 99%, and after the polymerization reaction has terminated, unreacted monomers are removed and the solid concentration and pH are adjusted to obtain a carbonic acid-modified nitrile-based copolymer latex for dip-molding.

Such carbonic acid-modified nitrile-based copolymer latex has a glass transition temperature of −50 to −15° C., for example, −45 to −20° C. If the glass transition temperature of the latex is less than the above ranges, the tensile strength is significantly lowered or the wearing sensation becomes worse due to the stickiness of a glove. On the contrary, if the glass transition temperature of the latex is more than the above ranges, undesirable cracks of a dip-molded article occur. The glass transition temperature may be adjusted by controlling the amount of conjugated diene monomer, and may be measured by Differential Scanning Calorimetry.

The average particle size of the carbonic acid-modified nitrile-based copolymer latex may be 50 nm or more, for example, 50 to 500 nm, 50 to 300 nm, or 60 to 200 nm. When the average particle diameter of the latex for dip-molding is within the above-mentioned ranges, the viscosity of the latex is not increased, so that the latex may be produced at a high concentration and the tensile strength of the produced dip-molded article may be improved. The average particle size of the latex for dip-molding may be adjusted by controlling the type and amount of emulsifier, and the average particle size may be measured by Laser Scattering Analyzer (Nicomp).

In this regard, the glass transition temperature may be adjusted depending on the amount of conjugated diene monomer, and the average particle diameter may be adjusted depending on the type and amount of emulsifier.

According to another embodiment of the present invention, an alkenyl succinic acid compound may be added to a carbonic acid-modified nitrile-based copolymer latex produced by the above steps to produce a latex composition for dip-molding.

A composition for dip-molding may be produced by adding, to a carbonic acid-modified nitrile-based copolymer latex composition, an additive, which is commonly used for dip-molding, such as a sulfur cross-linking agent for dip-molding, a vulcanization accelerator, a metal oxide such as zinc oxide, a pigment such as titanium dioxide, a filler such as silica, a thickener, a pH adjusting agent such as ammonia or alkali hydroxide, etc.

Such latex composition for dip-molding includes an alkenyl succinic acid compound together with a carbonic acid-modified nitrile-based copolymer, thereby resulting in improved workability due to increased latex stability and increased syneresis time, and thus producing a dip-molded article having lowered stickiness and increased tensile strength.

A latex composition for dip-molding including the above various additives and an alkenyl succinic acid includes 80 to 99% by weight, for example, 85 to 98% by weight, or 88 to 97% by weight, of a carbonic acid-modified nitrile-based copolymer and the physical properties of a dip-molded article may be ensured within these ranges.

In addition, a latex composition for dip-molding according to any embodiment of the present disclosure has a solid concentration of 5 to 40% by weight, for example, 8 to 35% by weight, or 10 to 33% by weight. If the concentration is too low, the transportation efficiency for a latex composition is deteriorated. If the concentration is too high, the solid concentration may lead to increased viscosity, thereby causing problems such as storage stability, etc. Thus, the solid concentration is appropriately adjusted to be within the above ranges.

The pH of a latex composition for dip-molding may be 8 to 12, for example, 9 to 11, or 9.3 to 10.5. If the pH is out of the above ranges, the stability of a latex composition for dip-molding may be decreased.

In this regard, the pH of a latex composition for dip-molding may be adjusted by adding a certain amount of a pH adjusting agent in the production of a latex for dip-molding. For a pH adjusting agent, 1 to 5% aqueous solution of potassium hydroxide or 1 to 5% ammonia water may be used.

Dip-Molded Article

The above-proposed latex composition for dip-molding enables a dip-molded article to be produced through a dip-molding process. Particularly, a latex composition for dip-molding according to any embodiment of the present disclosure may ensure, for example, a uniform thickness and superior physical properties even when a molded article is produced to have a thickness of tens to hundreds of microns.

For example, when a glove is produced using a latex composition for dip-molding according to any embodiment of the present disclosure, a high level of tensile strength is ensured for a thin glove of 3.2 g, and thus the produced thin glove is not easily tearable. In addition, thanks to slow syneresis, the workability is improved, which overcomes the problems that have occurred previously in the case of performing the process at a low concentration including lowered workability due to fast syneresis and resulting high defect rate in the production of the product.

As a dip-molding method for obtaining a dip-molded article according to any embodiment of the present disclosure, any conventional method may be used, such as a direct immersion method, an anode adhesion immersion method, a Teague adhesion immersion method, etc. Among these, an anode adhesion immersion method is, for example, used since a dip-molded article having a uniform thickness may be easily obtained.

The method of producing a dip-molded article using the composition according to any embodiment of the present disclosure includes the steps of:

a) coating the surface of a mold with a coagulant solution;

b) coating the coagulant-coated mold with a latex composition for dip-molding to form a dip-molded layer;

c) cross-linking the dip-molded layer; and d) peeling off the cross-linked dip-molded layer from the mold to obtain a dip-molded article.

Hereinafter, a method for producing a dip-molded article using a latex composition according to any embodiment of the present disclosure will be described in detail.

Step (a) Coating the Surface of Mold with Coagulant

In this step (a), a process of applying a coagulant to the surface of a mold is carried out by using a hand-shaped mold for dip-molding as a mold, coating the mold with a coagulant solution and then drying the mold.

Examples of coagulant includes metal halides such as barium chloride, calcium chloride, magnesium chloride, zinc chloride, aluminum chloride, etc.; nitrates such as barium nitrate, calcium nitrate, zinc nitrate, etc.; acetic acid salts such as barium acetate, calcium acetate, zinc acetate, etc.; sulfate such as calcium sulfate, magnesium sulfate, aluminum sulfate, etc. Among these, calcium chloride and calcium nitrate may be used. The coagulant solution is a solution in which the above enumerated coagulant is dissolved in water, alcohol or a mixture thereof. The concentration of coagulant in the coagulant solution is usually from 5 to 50% by weight, for example from 10 to 40% by weight.

Step (b) Forming Dip-Molded Layer in the Mold

Following above step (a), this step (b) is carried out by immersing a coagulant-adhered mold in the latex composition for dip-molding according to any embodiment of the present disclosure to form a dip-molded layer.

The coagulant-adhered mold is immersed in the latex composition for dip-molding made of the latex resin composition according to any embodiment of the present disclosure, and then the mold is taken out to have a dip-molded layer formed in the mold.

Step (c) Cross-Linking Dip-Molded Layer

Next, in this step (c), a step of cross-linking the latex resin is carried out by heat-treating the dip-molded layer formed in the mold.

The cross-linking is carried out through a heat treatment, in which treatment the water component first evaporates and curing is done through cross-linking Step (d) Obtaining Dip-Molded Article and Measuring the Physical Properties Thereof Subsequently, in this step (d), a dip-molded article is obtained from the mold, and the physical properties of the obtained dip-molded article are measured.

A dumbbell-shaped specimen is produced from the obtained dip-molded article in accordance with ASTM D-412. The specimen is pulled at an extension rate of 500 mm/min using UTM (Universal Testing Machine) and the tensile strength at break is measured.

The method according to any embodiment of the present disclosure may be used for any latex article which might be produced by any known dip-molding process. Specifically, it may be applied to any dip-molded latex article selected from health care articles such as surgical gloves, inspection gloves, condoms, catheters or various kinds of industrial and household gloves.

Hereinafter, for a better understanding, the invention is described by way of examples. However, the following examples are provided only to illustrate the invention. Thus, it will be apparent to those skilled in the art that variations and modifications may be made without departing from the scope and spirit of the invention. Furthermore, such variations and modifications are considered to be within the purview and scope of the appended claims.

Example 1: Production of Latex Composition for Dip-Molding and Dip-Molded Article (Production of Carbonic Acid-Modified Nitrile-Based Copolymer Latex)

A 10 L high-pressure reactor, equipped with a stirrer, a thermometer, a cooler and a nitrogen gas inlet, and adapted for continuous addition of monomers, an emulsifier and a polymerization initiator, was replaced with nitrogen, and 3 parts by weight of sodium alkylbenzene sulfonate, 0.1 part by weight (solid content) of potassium alkenylsuccinate (Latemul ASK, C16-18 alkenyl succinic acid di-potassium salt, produced by KAO, Japan), 0.5 part by weight of t-dodecyl mercaptan and 140 parts by weight of ion-exchanged water were added to 100 parts by weight of a monomer mixture including 30% by weight of acrylonitrile, 65% by weight of 1,3-butadiene and 5% by weight of methacrylic acid, and the temperature was elevated to 38° C.

0.3 part by weight of potassium persulfate, which is a polymerization initiator, was added thereto. When the conversion reached 95%, 0.1 part by weight of sodium dimethyl dithiocarbamate was added to terminate the polymerization. Unreacted monomers were removed through a stripping process, and ammonia water, an antioxidant, a defoaming agent, etc. were added to obtain a carboxylated acrylonitrile-butadiene-based copolymer latex having a solid concentration of 45% and a pH of 8.5.

The average particle size and glass transition temperature of the produced latex were measured. The average particle size was measured by Laser Scattering Analyzer (Nicomp), and the glass transition temperature was measured by Differential Scanning Calorimetry.

(Production of Composition for Dip-Molding)

A 3% potassium hydroxide solution and an appropriate amount of secondary distilled water were added to the produced latex to obtain a composition for dip-molding having a solid concentration of 15% and a pH of 10.0.

(Production of Dip-Molded Article)

12 parts by weight of calcium nitrate, 87.5 parts by weight of distilled water and 0.5 part by weight of a wetting agent (Teric 320, produced by Huntsman Corporation, Australia) were mixed to produce a coagulant solution. A hand-shaped ceramic mold was immersed in this solution for 1 minute, taken out of it, dried at 80° C. for 3 minutes, and a coagulant-applied hand-shaped mold was obtained.

Next, the mold to which the coagulant was applied was immersed in a latex composition for dip-molding produced in above item (2) for 1 minute, lifted up out of it, and dried at 120° C. for 4 minutes, and then immersed in water for 3 minutes. The mold was dried again at 120° C. for 4 minutes while confirming the syneresis time. The mold was dried again at 120° C. for 3 minutes and then crosslinked at 130° C. for 20 minutes. The crosslinked dip-molded layer was peeled off from the hand-shaped mold to obtain a glove-shaped dip-molded article.

Example 2: Production of Latex Composition for Dip-Molding and Dip-Molded Article A glove-shaped dip-molded article was produced in the same manner as in above Example 1 except that 0.1 part by weight of potassium alkenylsuccinate (AS200, alkenyl C16-18 succinic potassium salt, produced by LG Household & Health Care Ltd., Korea) was used instead of 0.1 part by weight of potassium alkenylsuccinate (Latemul ASK, produced by KAO, Japan) at the time of polymerization.

Example 3: Production of Latex Composition for Dip-Molding and Dip-Molded Article A glove-shaped dip-molded article was produced in the same manner as in above Example 1 except that 0.01 part by weight of potassium alkenylsuccinate (Latemul ASK, produced by KAO, Japan) was used at the time of polymerization.

Example 4: Production of Latex Composition for Dip-Molding and Dip-Molded Article A glove-shaped dip-molded article was produced in the same manner as in above Example 1 except that 1.0 part by weight of potassium alkenylsuccinate (Latemul ASK, produced by KAO, Japan) was used at the time of polymerization.

Example 5: Production of Latex Composition for Dip-Molding and Dip-Molded Article A glove-shaped dip-molded article was produced in the same manner as in above Example 1 except that 5.0 parts by weight of potassium alkenylsuccinate (AS200, produced by LG Household & Health Care Ltd., Korea) was used instead of potassium alkenylsuccinate (Latemul ASK, produced by KAO, Japan) at the time of polymerization.

Example 6: Production of Latex Composition for Dip-Molding and Dip-Molded Article A glove-shaped dip-molded article was produced in the same manner as in above Example 1 except that 10.0 parts by weight of potassium alkenylsuccinate (AS200, produced by LG Household & Health Care Ltd., Korea) was used instead of potassium alkenylsuccinate (Latemul ASK, produced by KAO, Japan) at the time of polymerization.

Example 7: Production of Latex Composition for Dip-Molding and Dip-Molded Article After polymerization, an alkenyl succinic acid compound was added to produce a latex composition for dip-molding and a dip-molded article.

(Production of Carbonic Acid-Modified Nitrile-Based Copolymer Latex)

A 10 L high-pressure reactor, equipped with a stirrer, a thermometer, a cooler and a nitrogen gas inlet, and adapted for continuous addition of monomers, an emulsifier and a polymerization initiator, was replaced with nitrogen, and 3 parts by weight of sodium alkylbenzene sulfonate, 0.5 part by weight of t-dodecyl mercaptan and 140 parts by weight of ion-exchanged water were added to 100 parts by weight of a monomer mixture including 30% by weight of acrylonitrile, 65% by weight of 1,3-butadiene and 5% by weight of methacrylic acid, and the temperature was elevated to 38° C.

0.3 part by weight of potassium persulfate, which is a polymerization initiator, was added thereto. When the conversion reached 95%, 0.1 part by weight of sodium dimethyl dithiocarbamate was added to terminate the polymerization. Unreacted monomers were removed through a stripping process, and ammonia water, an antioxidant, a defoaming agent and the like were added to obtain a carboxylated acrylonitrile-butadiene-based copolymer latex having a solid concentration of 45% and a pH of 8.5.

(Production of Composition for Dip-Molding)

0.1 part by weight of potassium alkenylsuccinate (Latemul ASK, produced by KAO, Japan), a 3% potassium hydroxide solution and an appropriate amount of secondary distilled water were added to 100 parts by weight of the produced latex to obtain a composition for dip-molding having a solid concentration of 15% and a pH of 10.0.

(Production of Dip-Molded Article)

12 parts by weight of calcium nitrate, 87.5 parts by weight of distilled water and 0.5 part by weight of a wetting agent (Teric 320, produced by Huntsman Corporation, Australia) were mixed to produce a coagulant solution. A hand-shaped ceramic mold was immersed in this solution for 1 minute, taken out of it, dried at 80° C. for 3 minutes, and a coagulant-applied hand-shaped mold was obtained.

Next, the mold, to which the coagulant was applied, was immersed in a latex composition for dip-molding produced in above item (2) for 1 minute, lifted up out of it, and dried at 120° C. for 4 minutes, and then immersed in water for 3 minutes. The mold was dried again at 120° C. for 4 minutes while confirming the syneresis time. The mold was dried again at 120° C. for 3 minutes and then crosslinked at 130° C. for 20 minutes. The crosslinked dip-molded layer was peeled off from the hand-shaped mold to obtain a glove-shaped dip-molded article.

Example 8: Production of Latex Composition for Dip-Molding and Dip-Molded Article At the time of and after polymerization, an alkenyl succinic acid compound was added to produce a latex composition for dip-molding and a dip-molded article.

Specifically, in the same manner as in Example 1, 0.1 part by weight of potassium alkenylsuccinate (Latemul ASK, produced by KAO, Japan) was added to produce a carbonic acid-modified nitrile-based copolymer latex. To 100 parts by weight of the produced latex was added 0.1 part by weight of potassium alkenylsuccinate (Latemul ASK, produced by KAO, Japan) to produce a latex composition for dip-molding.

The produced latex composition for dip-molding was used to produce a dip-molded article, and the specific procedure was carried out in the same manner as in Example 1.

Comparative Example 1: Production of Latex Composition for Dip-Molding and Dip-Molded Article A latex composition for dip-molding and a dip-molded article were produced in the same manner as in Example 1, except that alkenylsuccinate was not added.

Comparative Example 2: Production of Latex Composition for Dip-Molding and Dip-Molded Article A glove-shaped dip molded article was produced in the same manner as in Example 1, except that 12.0 parts by weight of potassium alkenylsuccinate (Latemul ASK, produced by KAO, Japan) was used at the time of polymerization.

Experimental Example 1: Measurement of Physical Properties of Dip-Molded Article The physical properties of dip-molded articles produced in the above Examples and Comparative Examples were measured, and the results are shown in Table 1 below.

(1) Measurement of Syneresis (Sec)

In order to confirm the syneresis time, a coagulant-applied mold was immersed in the above-described composition for dip-molding for 15 seconds, lifted up out of it, dried at 120° C. for 4 minutes, and the syneresis time was determined by confirming how long water droplets fall down.

(2) Stickiness (10-Point Scoring Method)

When a dip-molded article was produced, the stickiness was indicated by a 10-point scoring method while peeling off a dip-molded layer from the hand-shaped mold. The higher the score is, the less the stickiness is.

(3) Measurement of Tensile Strength

According to the ASTM D638 method, the specimen was pulled at a cross head speed of 500 mm/min using a test instrument U.T.M (manufactured by Instron, model name: 4466), and the point, at which the specimen was cut, was measured. The tensile strength was calculated by the following equation:

Tensile strength (kgf/mm$^2$)=load value (kgf)/thickness (mm)×width (mm)

TABLE 1

| | Addition of alkenyl succinic acid compound (amount, parts by weight) | Syneresis (sec) | Stickiness (10-point scoring method) | Tensile strength (MPa) |
|---|---|---|---|---|
| Example 1 | At the time of polymerization (0.1 part by weight) | 158 | 7 | 31.2 |
| Example 2 | At the time of polymerization (0.1 part by weight) | 128 | 9 | 28.4 |
| Example 3 | At the time of polymerization (0.01 part by weight) | 98 | 5 | 29.5 |
| Example 4 | At the time of polymerization (1.0 part by weight) | >360 | 9 | 32.5 |
| Example 5 | At the time of polymerization (5.0 parts by weight) | >360 | 9 | 30.1 |
| Example 6 | At the time of polymerization (10 parts by weight) | >360 | 6 | 26.5 |
| Example 7 | After polymerization (0.1 part by weight) | 183 | 7 | 33.3 |
| Example 8 | At the time of polymerization (0.1 part by weight)/ After polymerization (0.1 part by weight) | >360 | 8 | 34.8 |
| Comparative Example 1 | — | 47 | 2 | 30.3 |
| Comparative Example 2 | At the time of polymerization (12 parts by weight) | >360 | 5 | 12.4 |

As shown in above Table 1, when an alkenyl succinic acid compound was used as proposed in the present disclosure, it was found that not only the syneresis time was increased, but also the stickiness was decreased and the tensile strength was improved. These tendencies were equally observed for the cases where an alkenyl succinic acid compound was added either before or after the polymerization as well as the case where it was added both before and after polymerization. Among them, the best results were obtained for the case where it was added at the time of polymerization.

In contrast, in Comparative Example 1 in which an alkenyl succinic acid compound was not used, the syneresis time was shortened to about one-ninth as compared to Example 4, and the stickiness also became severe.

As can be seen from these results, the workability of a dip-molding process and the physical properties of a dip-molded article can be effectively controlled by adjusting the addition, the amount of addition and the timing of addition of an alkenyl succinic acid compound proposed in the present disclosure.

A latex composition for dip-molding according to any embodiment of the present disclosure may be used in the production of latex articles including, for example, health care products, such as various industrial and household gloves.

The invention claimed is:

1. A latex composition for dip-molding comprising: a carbonic acid-modified nitrile-based copolymer latex; and an alkenyl succinic acid compound, wherein the alkenyl succinic acid compound is represented by the following formula (1) or a sodium (Na+), potassium (K+), or lithium (Li+) salt thereof:

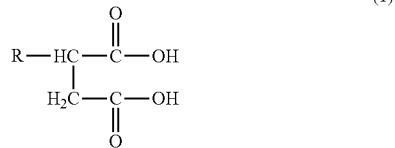

(1)

wherein R is a linear or branched C12-C20 alkenyl group, and the alkenyl succinic acid compound is included in an amount of 0.01 to 10 parts by weight based on 100 parts by weight of the total amount of monomers used at the time of copolymerization of the carbonic acid-modified nitrile-based copolymer latex.

2. The composition of claim 1, wherein the carbonic acid-modified nitrile-based copolymer latex has a glass transition temperature of −50 to −15° C. and an average particle diameter of 50 to 500 nm.

3. The composition of claim 1, wherein R is a linear C12-C20 alkenyl group.

4. The composition of claim 1, wherein the latex composition for dip-molding is produced by adding the alkenyl succinic acid compound at the time of copolymerization of the carbonic acid-modified nitrile-based copolymer latex.

5. The composition of claim 1, wherein the latex composition for dip-molding is produced by being mixed with the alkenyl succinic acid compound after the carbonic acid-modified nitrile-based copolymer latex is produced.

6. The composition of claim 1, wherein the latex composition for dip-molding is produced by adding the alkenyl succinic acid compound at the time of copolymerization of a latex composition to produce the carbonic acid-modified nitrile-based copolymer latex, and mixing the produced carbonic acid-modified nitrile-based copolymer latex with the alkenyl succinic acid compound to produce the latex composition for dip-molding.

7. The composition of claim 4, wherein the addition of the alkenyl succinic acid compound at the time of the copolymerization is carried out before or during the initiation of the copolymerization.

8. The composition of claim 1, wherein the carbonic acid-modified nitrile-based copolymer is produced by copolymerization of monomers comprising 40 to 89% by weight of a conjugated diene monomer, 10 to 50% by weight of an ethylenically unsaturated nitrile-based monomer and 0.1 to 10% by weight of an ethylenically unsaturated acid monomer.

9. The composition of claim 8, wherein the conjugated diene monomer includes one selected from the group consisting of 1,3-butadiene, 2,3-dimethyl-1,3-butadiene, 2-ethyl-1,3-butadiene, 1,3-pentadiene, isoprene, and combinations thereof.

10. The composition of claim 8, wherein the ethylenically unsaturated nitrile-based monomer includes one selected from the group consisting of acrylonitrile, methacrylonitrile, fumaronitrile, α-chloronitrile, α-cyanoethyl acrylonitrile, and combinations thereof.

11. The composition of claim 8, wherein the ethylenically unsaturated acid monomer includes one selected from the group consisting of acrylic acid, methacrylic acid, itaconic acid, maleic acid, fumaric acid, maleic anhydride, citraconic anhydride, styrene sulfonic acid, monobutyl fumarate, monobutyl maleate, mono-2-hydroxypropyl maleate, and combinations thereof.

12. The composition of claim 1, wherein the carbonic acid-modified nitrile-based copolymer latex is produced by copolymerization in which 0.3 to 30 parts by weight of an emulsifier, 0.01 to 2 parts by weight of a polymerization initiator and 0.1 to 2.0 parts by weight of a molecular weight modifier are added, based on 100 parts by weight of the total amount of monomers.

13. The composition of claim 6, wherein the addition of the alkenyl succinic acid compound at the time of the copolymerization is carried out before or during the initiation of the copolymerization.

\* \* \* \* \*